United States Patent [19]

Kunkel et al.

[11] 4,428,923
[45] Jan. 31, 1984

[54] CONTINUOUS PROCESS FOR THE PRODUCTION OF HYDROGEN PEROXIDE ACCORDING TO THE ANTHRAQUINONE PROCESS

[75] Inventors: Wolfgang Kunkel, Kleinostheim; Jörg Kemnade, Kelkheim-Fischbach; Dietrich Schneider, Buchschlag, all of Fed. Rep. of Germany

[73] Assignee: Degussa Aktiengesellschaft, Frankfurt, Fed. Rep. of Germany

[21] Appl. No.: 440,347

[22] Filed: Nov. 9, 1982

[51] Int. Cl.³ .............................................. C01B 15/02
[52] U.S. Cl. .................................................. 423/588
[58] Field of Search ........................ 423/588, 589, 590

[56] References Cited

U.S. PATENT DOCUMENTS 3,423,176 1/1969 Kabisch et al. ...................... 423/588

Primary Examiner—Earl C. Thomas
Assistant Examiner—Wayne A. Langel
Attorney, Agent, or Firm—Cushman, Darby & Cushman

[57] ABSTRACT

There is provided a continuous parallel current flow process for carrying out the catalytic hydrogenation with hydrogen or a hydrogen containing gas for the production of hydrogen peroxide in the anthraquinone process using palladium black suspended in the working solution at a temperature up to 100° C. and a pressure up to 15 bar absolute in a reaction space constructed as a meandering tube system in which the hydrogenation is carried out in a loop reactor made of tubes of the same nominal diameter and arranged either vertically or horizontally and connected by curving tubes (tube elbows) at flow velocities in the tubes of more than 3 m/sec.

7 Claims, 2 Drawing Figures

CONTINUOUS PROCESS FOR THE PRODUCTION OF HYDROGEN PEROXIDE ACCORDING TO THE ANTHRAQUINONE PROCESS

BACKGROUND OF THE INVENTION

The present invention is directed to a process for carrying out the hydrogenation in the anthraquinone process for the production of hydrogen peroxide.

It is known in the mentioned anthraquinone process or AO process (see in this regard the collected summarizing presentation in Ullmanns Enzyklopadie der techn. Chemie, 4th newly revised and expanded edition, Vol. 17, pages 697–704), to dissolve an anthraquinone derivative, and the reaction carrier in a solvent or mixture of solvents and to hydrogenate the thus obtained working solution in the presence of a catalyst. Thereby a portion of the anthraquinone derivative is converted into the corresponding anthraquinone derivative. After filtering off the hydrogenation catalyst the working solution is gassed with oxygen or an oxygen containing gas (usually air), whereby the anthraquinone is reformed with formation of hydrogen peroxide.

After extraction of the hydrogen peroxide dissolved in the working solution with water, the working solution can again be supplied to the hydrogenation step. By continuous repetition of the individual process steps there is attained a circular process in which hydrogen peroxide is synthesized from the gases hydrogen and oxygen.

In the hydrogenation the catalyst is generally employed as a fixed bed or as a suspension catalyst. While in reactors with fixed bed catalysts the catalyst is introduced on a carrier, in using suspension catalysts these catalysts are present in the reactor both as carrier catalysts as well as without carrier.

The illustrative forms of these so-called low pressure-hydrogenation reactors described in the literature are mostly stirred vessel reactors in which by intensive stirring both the catalyst is held in suspension and the gas phase is dispersed (Chem. Ing. Tech., Vol. 52, pages 1–7, especially 5, (1980)).

Furthermore, there are known the so-called double tube loop reactors in which the hydrogen is mixed by means of a power jet through which there is produced a revolving flow which should maintain the catalyst in suspension. The loop reactor described in the literature depends on the principle of mixing in the gas phase by means of a jet nozzle whereby the liquid is recycled via a primary cycle.

These known reactors all have the disadvantage that the hydrogen in the liquid is not completely reacted in a single passage and therefore must be recycled.

In German patent 1542089 and related Kabisch U.S. Pat. No. 3,423,176 therefore there is proposed a reactor which is equipped with tubes changing from thin to thick, see the drawing, whereby the upwardly leading narrow tubes should be flowed through with a velocity of 1.5 to 3 m/sec. The entire disclosure of the Kabish U.S. patent is hereby incorporated by reference and relied upon. It was believed that by limiting the velocity to a maximum of 3 m/sec. in the thin tubes so-called grinding and pulverizing forces are avoided.

The repeated tubular contractions, respective widenings, should effect a good mixing of the hydrogen into the liquid phase so that there can be eliminated special gas distributors or gas inlet apparatus.

Precisely with larger tube diameters (>1000 mm), however, there occurs at the tube widenings a phase separation gas/liquid which can place the function of the reactor completely in question through a breaking down of the flow; this was not considered.

According to the description in German patent No. 1542089 (and in the Kabisch U.S. patent) the there described operating conditions and the hoped for good, thorough mixing of gas, liquid, and suspension-catalyst should develop the full activity of the catalyst.

This assumption is based on the proposition that the specific reaction rate speed determining step is in the transition material gas/liquid. However, experiments to increase the catalyst production further (moles of hydroquinone per $m^3 \cdot h$) through a still better gas distribution, i.e. to increase the reaction, led to no success.

SUMMARY OF THE INVENTION

It has now been shown that contrary to previous knowledge, the catalyst activity can be increased considerably if the micro turbence at the catalyst is increased, since surprisingly the material transportation processes at the catalyst and not the hydrogen transportation from the gas phase into the liquid phase are those which influence the catalyst prductivity.

It has now been found that the productivity of palladium black catalyst and the reaction rate can be increased in a continuous parallel current flow process for carrying out the catalytic hydrogenation with hydrogen or a hydrogen containing gas for the production of hydrogen peroxide in the so-called anthraquinone process at a temperature up to 100° C. and a pressure up to 15 bar absolute with the catalyst suspended in the working solution by carryout the hydrogenation in a loop reactor made of tubes of the same nominal width, which are arranged either vertically or horizontally and connected by curving (elbow) tubes at flow velocities in the tubes of more than 3 m/sec. and up to 10 m/sec.

The flow velocity preferably is 4–7 m/sec. The nominal width diameter is between 50 and 1000 mm preferably 500 mm. The reaction space is preferably extended longitudinally although there can also be used a spread out reaction space made of several tubes which are connected by elbow tubes.

The total length, which is so selected that no recycling of the hydrogen is necessary and the hydrogen has completely reacted at the end of the reaction space is 15–150 meters.

To reduce the area of the reactors, the reactor can be constructed of vertically running tubes, which are joined by means of tubular elbows. The total reactor here also consists of tubes of the same diameter. The length in this arrangement likewise is 15–150 meters, the total height 5–20 meters.

The flow velocity in the reange of more than 3 m/sec., preferably 4–7 m/sec., is so regulated that the phase boundary area gas/liquid remains as it is formed at the entrance of the gas into the tube system.

A further enlargement of the phase boundary area gas/liquid in the thus established flow condition does not bring about a further increase of the reaction rate. The energy expounded then is completely used up for the accelaration of the material transportation process in the phase boundary layer liquid/solid.

Therefore the necessary catalyst concentration can be held very small in the hydrogenation reactor; this is precisely what is essential with noble metal catalysts. The concentration of the palladium black is less than 10 kg per m³ of reaction solution and can be as low as 0.2 gram/l. Preferably the catalyst is between 0.5 and 3 kg per m³ of reaction solution. The hydrogenation is carried out at a temperature usually between 20° and 100° C., preferably at 40°–60° C. The pressure is usually 1–15 bar, preferably 2–5 bar.

As reaction carrier there can be employed any of the conventional anthraquinone derivatives, for example, there can be used alkyl anthraquinones such as 2-tert. butyl anthraquinone, 2-amyl anthraquinone, 2-methyl anthraquinone, 2-ethyl anthraquinone, 2-butyl anthraquinone, 2-isopropyl anthraquinone, 2-sec. butyl anthraquinone, 2-sec. amyl anthraquinone, 1,3-diethyl anthraquinone, 2,3-dimethyl anthraquinone, 1,4-dimethyl anthraquinone, 2,7-dimethyl anthraquinone, 2,7-dimethyl anthraquinone, tetrahydro-anthraquinones such as 2-ethyl tetrahydroanthraquinones, mixtures such as a mixture of isopropyl anthraquinone and sec. butyl anthraquinone, eutectic mixture of anthraquinones, esters of anthraquinone carboxylic acids and hetero nuclear disubstituted alkyl anthraquinones.

There also can be used the conventional quinone solvents, e.g. benzene, toluene, tert.butyl-benzene, tert.butyl-toluene, polyalkylated benzenes, e.g. trimethylbenzene and tetramethyl benzene, and methyl naphthalene.

Also there can be used the conventional hydroquinone solvents such as organic phosphates and phosphonates including trioctyl phosphate, triamyl phosphate tri 2-ethylhexyl phosphate, diphenyl butyl phosphate, tributyl phosphate, triisobutyl phosphate, diphenyl octyl phosphate, diphenyl cresyl phosphate, tricesyl phosphate, butyl diisoamyl phosphate, triisoamyl phosphate, tri nonyl phosphate, tris decyl phosphate, dibutyl butane phosphonate, diethyl pentane phosphonate, dibutyl pentane phosphonate, diethyl hexane phosphonate, dibutyl hexane phosphate, dibutyl octane phosphonate, dibutyl decane phosphonate, and dioctyl octane phosphonate, diisobutyl carbinol, methylcyclohexanone esters, e.g. methyl cyclohexyl acetate, N,N-dialkyl carboxylic acid amides, e.g. N,N-dimethyl formamide and N,N-dimethyl acetamide, and tetrasubstituted ureas such as tetrahydrocarbyl ureas where the hydrocarbyl groups for example are alkyl, cycloalkyl and aryl. Illustrative substituted ureas include tetramethyl urea, N,N-diethyl-N',N'-di-n-butyl urea, N,N-dimethyl-N',N'methyl-3-methoxy-n-propyl urea, N,N-dimethyl-N',N'-methyl-2,3,5 or 6 methyl-4-methoxy-1-cyclohexyl urea, N,N-dimethylcarbamoyl-N'-morpholine, tetraethyl urea, tetrapropyl urea, tetraisopropyl urea, N,N',N-trimethyl-N-ethyl urea, N,N'-dimethyl-N,N'-di(dodecyl)urea, N-methoxyethyl-N-methyl-N',N'-diethyl urea, N-amyloxymethyl-N,N',N'-trimethyl urea, N,N-dipropoxypropyl, N',N'-diethyl urea, N,N'-dimethyl, N,N'-diamyl urea, tetracyclohexyl urea, N,N',N'-trimethyl, N-cyclohexyl urea, N,N'-diethyl, N,N'-di(4-methylcyclohexyl)urea, N,N-diethyl carbamoyl piperidine, carbodimorpholine, N'N'-dimethyl carbamoyl-N'-thiomorpholine, N,N-diethyl carbamoyl-N'-oxazolidine, N,N,N'-trimethyl-N'-phenyl urea, N,N'-dimethyl-N,N'-diphenyl urea, and N,N,N'-trimethyl-N'-p-tolyl urea.

DETAILED DESCRIPTION

Figure 1:
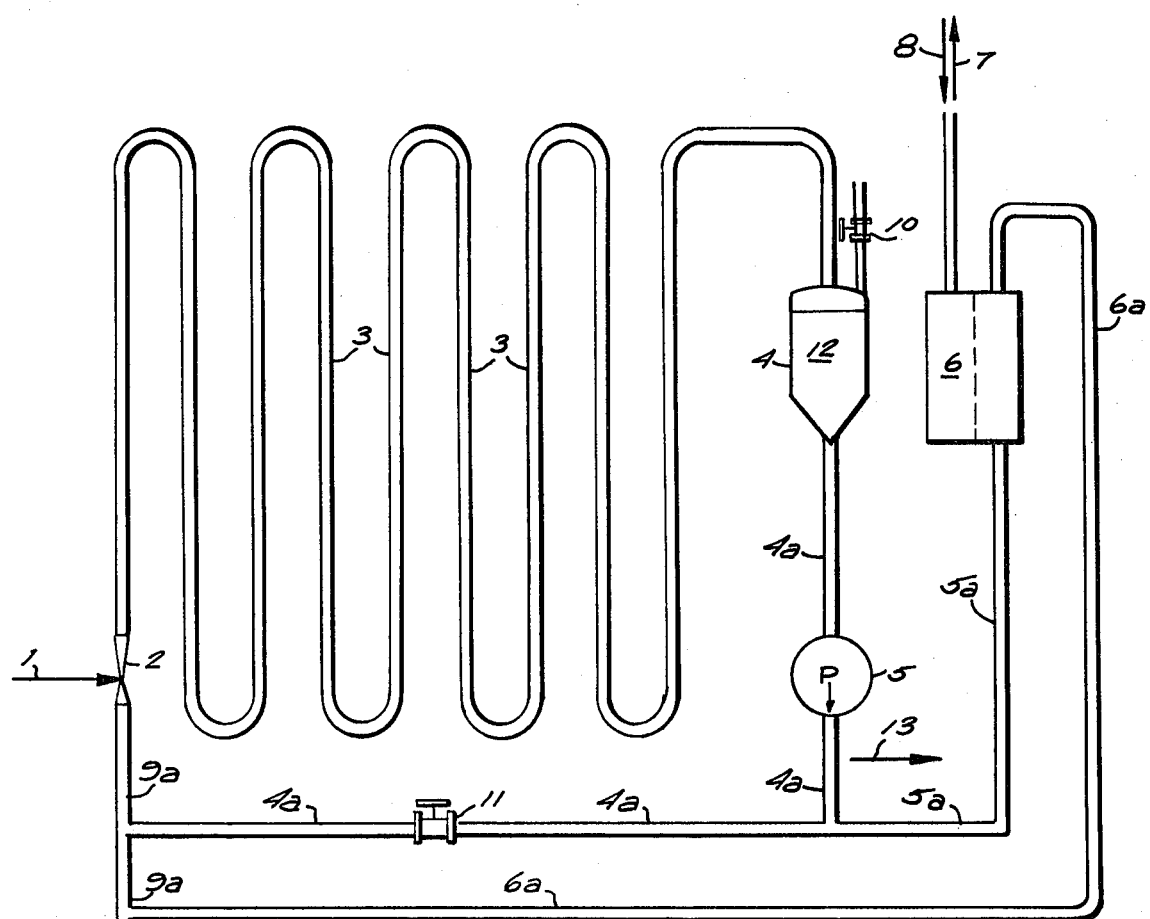
FIG. 1 of the accompanying drawing diagrammatically shows an apparatus suitable for carrying out the process according to the invention.

The function of the reactor is described below in connection with FIG. 1.

Figure 2:
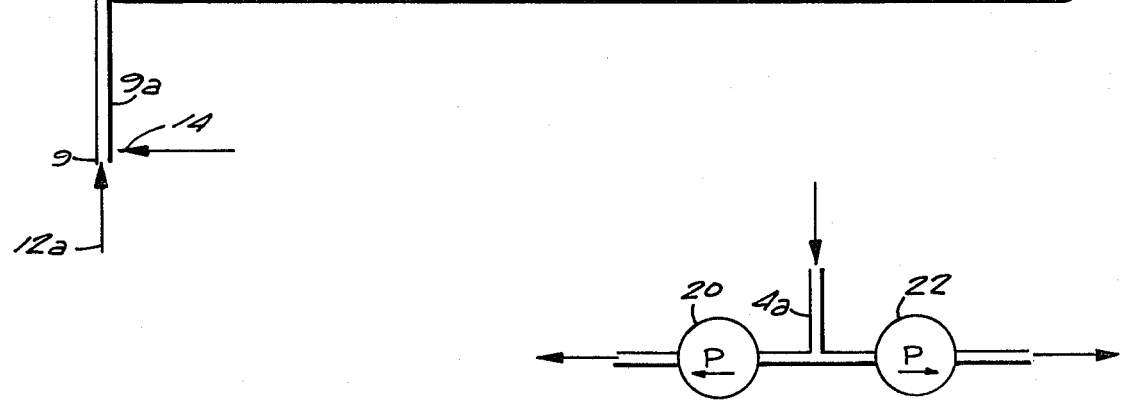
FIG. 2 shows an alternative modification of the apparatus.

The liquid phase 12 containing the suspended catalyst is conveyed from the pump supply vessel 4, which simultaneously serves as a gas separator, by means of a conveyor pump 5 via the line 4a and 9a to the gas inlet 2. A partial stream 5a flows via a filter device 6, likewise via lines 6a and 9a to the gas inlet 2. A distribution of the mass flow is controlled via a butterfly valve 11. This function can also be carried out without a butterfly valve by two separate pumps 20 and 22 (see FIG. 2).

The gas phase 1 is dispersed into the liquid phase at the gas inlet 2, which is customarily constructed as frit, screen or nozzle, preferably as a Venturi nozzle. From here the three phase mixture flows again via the tube system 3 to the pump supply vessel 4. The gas phase reacts in the tube system up to the inert gas portion. The inert gas portion is removed from the reaction system by means of a pressure retaining valve 10.

A partial stream of the product stream is freed from catalyst with the help of a filter system 6 and led off. This filtered product stream is replaced at inlet 9 by fresh catalyst free liquid phase 12a. For the regeneration of the filter surface in system 6 at specific time intervals the filter is back rinsed by means of fresh or already filtered liquid phase via 8. Through this the catalyst is likewise maintained in the cycle. An exchange of the catalyst during the operation takes place as needed at inlet 13 or 14.

The reaction volume embraces the apparatus volume from the inlet 2 to the entrance into the pump supply vessel or gas separator 4.

The process can comprise, consist essentially of, or consist of the stated steps with the recited materials.

EXAMPLE

In a reactor which according to German Patent No. 1542089 (and Kabisch U.S. Pat. No. 3,423,176) was designed with thick (downward) and thin (upward) tubes having diameters of 700 or 350 mm and has a reaction volume of 18 m³ there could be formed per hour a maximum of 41 kmol of hydroquinone from 2-ethylanthraquinone. The solvent consisted of 75 volume % aromatic benzine having a boiling range of 185°–205° C. and 25 volume % of tris-2-ethylhexyl phosphate. The total content of quinone was 130 grams/l of working solution. Of the quinones 60 weight % was in the form of the tetrahydroanthraquinone. The flow velocity in the tubes was 0.72 m/sec or 2.9 m/sec.

By exchange of the thick tubes (diameter 700 mm) to tubes having a diameter of 350 mm the reaction volume was reduced to 9.1 m³. Because of the elimination of pressure losses at the tube expansions and tube contractions in the new reactor at the same pump capacity, there could now be attained a flow velocity of 4.9 m/sec of the liquid phase. In spite of the reduced reaction volume to 9.1 m³, however, there could be formed 45.5 kmol of hydroquinone per hour.

The catalyst concentration was unchanged at 1.5 gram of palladium per liter of working solution. As stated above, the total 2-ethylanthraquinone content amounted to 130 grams per liter of working solution.

The industrial advance of the process of the invention above all, lies in the considerable improvement of the catalyst productivity at a given catalyst concentration, which leads to higher spacetime yields. Through this there is the possibility of obtaining a predetermined yield in a substantially smaller reaction volume, or to increase this yield despite the reduced reaction volume. Automatically there occurs through the reduced reaction volume, a savings in amounts of working solution and catalyst. It means that the carrying out of the hydrogenation, even in large scale, is not injured by a breaking off of the flow.

It could not be predicted that the use of a tubular reactor having tubes of the same nominal width would lead to this type of success while maintaining a specific minimum velocity.

The previous opinion according to German Patent No. 1542089 (and related to Kabisch U.S. Pat. No. 3,423,176) or also German Patent No. 740674 that the gas distribution was the decisive material for increasing the capacity of industrial reactors has proven false. Rather than improving an adequate gas distribution, the increase of the catalyst productivity was produced unexpectedly by increasing the microturbulence at the catalyst.

What is claimed is:

1. In a process for the production of hydrogen peroxide by the anthraquinone process including a step of the catalyst hydrogenation with hydrogen or a hydrogen containing gas using a working solution having palladium black suspended therein and employing a meandering tube system as the reaction space at a temperature up to 100° C. and a pressure up to 15 bar, the improvement comprising carrying out the hydrogenation in a loop reactor made of tubes of the same nominal width and which are arranged vertically or horizontally and are connected by tube elbows of the same nominal width at a flow velocity in the tubes of at least 3 m/sec.

2. A process according to claim 1 wherein the flow velocity is 4–7 m/sec.

3. A process according to claim 2 wherein the palladium black concentration is not over 10 kg/m$^3$ of reaction solution.

4. A process according to claim 3 wherein the palladium black concentration is between 0.5 and 3 kg/m$^3$ of reaction solution.

5. A process according to claim 1 wherein the palladium black concentration is not over 10 kg. m$^3$ of reaction solution.

6. A process according to claim 4 wherein the palladium black concentration is between 0.5 and 3 kg/m$^3$ of reaction solution.

7. A process according to claim 1 wherein the temperature is 20° to 100° C., the pressure is 1 to 15 bar, the flow velocity is 3 to 10 m/sec and the concentration of palladium black is 0.2 gram/1 to 10 kg/m$^3$ of reaction solution.

* * * * *